(12) United States Patent
Guim Bernat et al.

(10) Patent No.: US 11,128,555 B2
(45) Date of Patent: Sep. 21, 2021

(54) METHODS AND APPARATUS FOR SDI SUPPORT FOR AUTOMATIC AND TRANSPARENT MIGRATION

(71) Applicant: INTEL CORPORATION, Santa Clara, CA (US)

(72) Inventors: Francesc Guim Bernat, Barcelona (ES); Susanne M. Balle, Hudson, NH (US); Daniel Rivas Barragan, Cologne (DE); John Chun Kwok Leung, Folsom, CA (US); Mark S. Myers, Portland, OR (US); Suraj Prabhakaran, Aachen (DE); Murugasamy K. Nachimuthu, Beaverton, OR (US); Slawomir Putyrski, Gdynia (PL)

(73) Assignee: INTEL CORPORATION, Santa Clara, CA (US)

( * ) Notice: Subject to any disclaimer, the term of this patent is extended or adjusted under 35 U.S.C. 154(b) by 595 days.

(21) Appl. No.: 15/655,874

(22) Filed: Jul. 20, 2017

(65) Prior Publication Data
US 2018/0027093 A1 Jan. 25, 2018

Related U.S. Application Data

(60) Provisional application No. 62/427,268, filed on Nov. 29, 2016, provisional application No. 62/423,727, (Continued)

(51) Int. Cl.
*G06F 15/177* (2006.01)
*H04L 12/26* (2006.01)
(Continued)

(52) U.S. Cl.
CPC .......... *H04L 43/16* (2013.01); *G06F 16/2282* (2019.01); *G06F 16/2379* (2019.01);
(Continued)

(58) Field of Classification Search
CPC ..... H04L 43/16; H04L 41/0896; H04L 67/34; H04L 41/0816; H04L 67/1031;
(Continued)

(56) References Cited

U.S. PATENT DOCUMENTS

| | | | |
|---|---|---|---|
| 9,742,617 B2 * | 8/2017 | Chowdhry | .......... H04L 41/5009 |
| 2007/0106857 A1 * | 5/2007 | Koning | ................... G06F 16/10 |
| | | | 711/162 |

(Continued)

*Primary Examiner* — Anh Nguyen
(74) *Attorney, Agent, or Firm* — Kacvinsky Daisak Bluni PLLC

(57) ABSTRACT

Techniques for migration for composite nodes in software-defined infrastructures (SDI) are described. A SDI system may include a SDI manager component, including one or more processor circuits, configured to access one or more remote resources, the SDI manager component may include a partition manager configured to receive a request to create a composite node from an orchestrator component, the request including at least one preferred compute sled type and at least one alternative compute sled type. The SDI manager may create a composite node using a first compute sled matching the at least one alternative compute sled type. The SDI manager may determine, based upon a migration table stored on a non-transitory computer-readable storage medium that a second compute sled matching the at least one preferred compute sled type is available. The SDI manager may perform an migration from the first compute sled to the second compute sled. Other embodiments are described and claimed.

25 Claims, 19 Drawing Sheets

Related U.S. Application Data filed on Nov. 17, 2016, provisional application No. 62/376,859, filed on Aug. 18, 2016, provisional application No. 62/365,969, filed on Jul. 22, 2016.

(51) Int. Cl.

| | |
|---|---|
| *G06F 16/22* | (2019.01) |
| *G06F 16/23* | (2019.01) |
| *H04L 12/24* | (2006.01) |
| *H04L 12/927* | (2013.01) |
| *H04Q 9/00* | (2006.01) |
| *H04L 29/08* | (2006.01) |
| *H04L 12/925* | (2013.01) |

(52) U.S. Cl.
CPC ...... *H04L 41/0816* (2013.01); *H04L 41/0896* (2013.01); *H04L 41/12* (2013.01); *H04L 41/5025* (2013.01); *H04L 43/0876* (2013.01); *H04L 47/803* (2013.01); *H04L 67/10* (2013.01); *H04L 67/1031* (2013.01); *H04L 67/34* (2013.01); *H04Q 9/00* (2013.01); *H04L 41/16* (2013.01); *H04L 41/5009* (2013.01); *H04L 41/5054* (2013.01); *H04L 43/0858* (2013.01); *H04L 43/0894* (2013.01); *H04L 47/722* (2013.01); *H04L 47/805* (2013.01); *H04Q 2209/20* (2013.01)

(58) Field of Classification Search
CPC ..... H04L 41/5025; H04L 67/10; H04L 41/12; H04L 47/803; H04L 43/0876; H04L 41/5054; H04L 41/5009; H04L 47/722; H04L 41/16; H04L 47/805; H04L 43/0894; H04L 43/0858; G06F 16/2379; G06F 16/2282; H04Q 9/00; H04Q 2209/20
USPC .......................................................... 709/221
See application file for complete search history.

(56) References Cited

U.S. PATENT DOCUMENTS

| | | | |
|---|---|---|---|
| 2009/0007099 A1* | 1/2009 | Cummings | G06F 9/45558 718/1 |
| 2014/0201267 A1* | 7/2014 | Yang | H04W 4/00 709/203 |
| 2015/0040127 A1* | 2/2015 | Dippenaar | G06F 9/4856 718/1 |
| 2015/0058486 A1* | 2/2015 | Huang | G06F 9/4856 709/226 |
| 2017/0041191 A1* | 2/2017 | Kato | H04L 41/0813 |
| 2018/0096136 A1* | 4/2018 | LeMay | G06F 21/53 |
| 2018/0246757 A1* | 8/2018 | Li | G06F 9/4401 |

* cited by examiner

800

METHODS AND APPARATUS FOR SDI SUPPORT FOR AUTOMATIC AND TRANSPARENT MIGRATION

RELATED APPLICATIONS

This application claims priority to U.S. Provisional Patent Application No. 62/427,268, filed Nov. 29, 2016; U.S. Provisional Patent Application No. 62/423,727, filed Nov. 17, 2016; U.S. Provisional Patent Application No. 62/376,859, filed Aug. 18, 2016; and U.S. Provisional Patent Application No. 62/365,969, filed Jul. 22, 2016; each of which is hereby incorporated by reference in its entirety.

BACKGROUND

Applications executed in a data center may use a set of resources in order to achieve a certain goal (e.g., process database queries performed by users). Applications may be sensitive to a subset of resources from all the resources available within a particular data center. For example a database within the data center may use processors, memory, disk, and fabric, but may be most sensitive to processor and memory availability and performance. Data center throughput may be increased by adding resources, such as memory and compute bandwidth and power. However, increasing other resources, such as fabric or disk may not provide a direct benefit to throughput. Furthermore, reduction of memory or compute bandwidth may have negative impact on throughput. Data center architectures have addressed the problem of mapping the correct amount of resources to the applications using applications requirements, which may be provided by the user or directly by the application, in order to do the proper resource selection and allocation. This process may include selecting the set of resources and also ensuring that certainty quantities and qualities such as the needed Quality of Service (QoS) are reserved to satisfy the requirements. However, in many data center architectures, such as those using software defined infrastructure, there are remaining challenges with respect to the correct allocation and management of resources. Accordingly, improved techniques for the management of resources within data center architectures are desirable.

DETAILED DESCRIPTION

Figure 1:
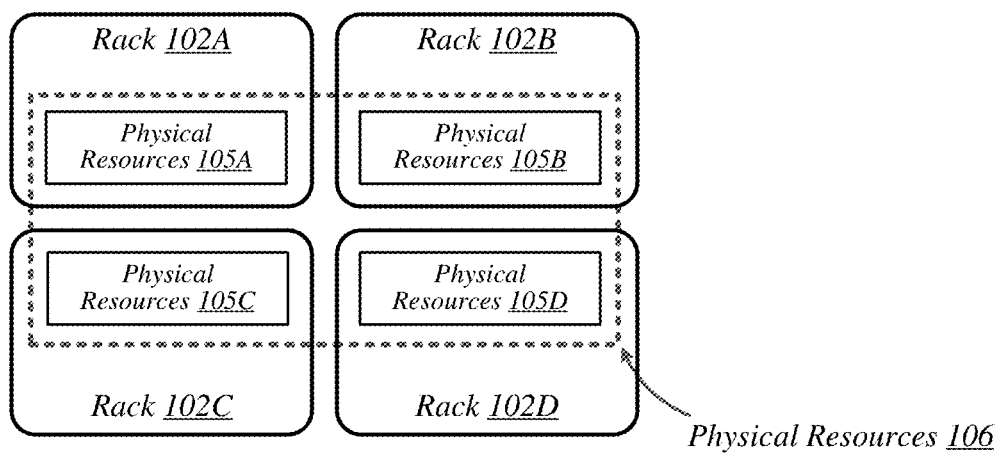
FIG. 1 illustrates an example of a data center.

Various embodiments are generally directed to techniques for management of software defined infrastructure (SDI) systems. In particular, some embodiments are directed to automated migration techniques within SDI environments, which may provide the ability to hibernate an application running on a first composite node, and migrate the application to a second, more desirable, composite node.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given. The devices described herein may be any of a variety of types of computing devices, including without limitation, a server, a workstation, a data center, or the like.

In various embodiments, the aforementioned processors may include any of a wide variety of commercially available processors, including without limitation, an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, the aforementioned storages may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, networks may be a single network possibly limited to extending within a single building or other relatively limited area, a combination of connected networks possibly extending a considerable distance, and/or may include the Internet. Thus, networks may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the aforementioned interfaces may include circuitry providing at least some of the requisite functionality to enable such coupling. However, the aforementioned interfaces may also be at least partially implemented with sequences of instructions executed by the processor elements (e.g., to implement a protocol stack or other features). Where one or more portions of the networks may employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the networks entail the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation. Furthermore, as used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
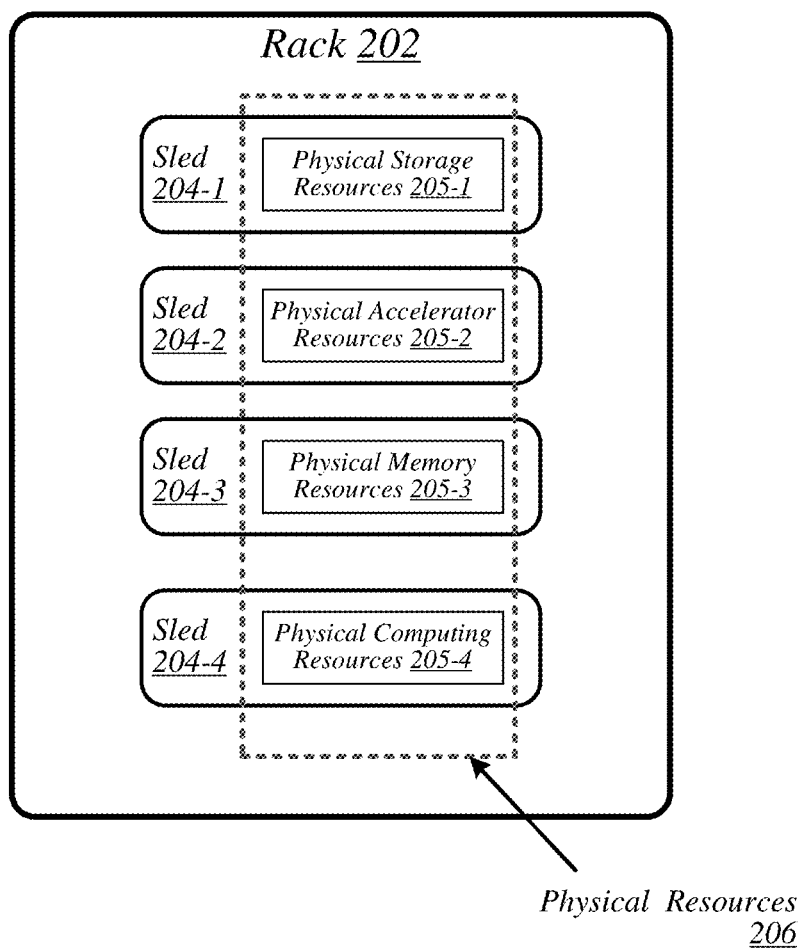
FIG. 2 illustrates an example of a rack.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive higher current than typical for power sources. The increased current enables the power sources to provide additional power to the components on each sled, enabling the components to operate at higher than typical frequencies. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
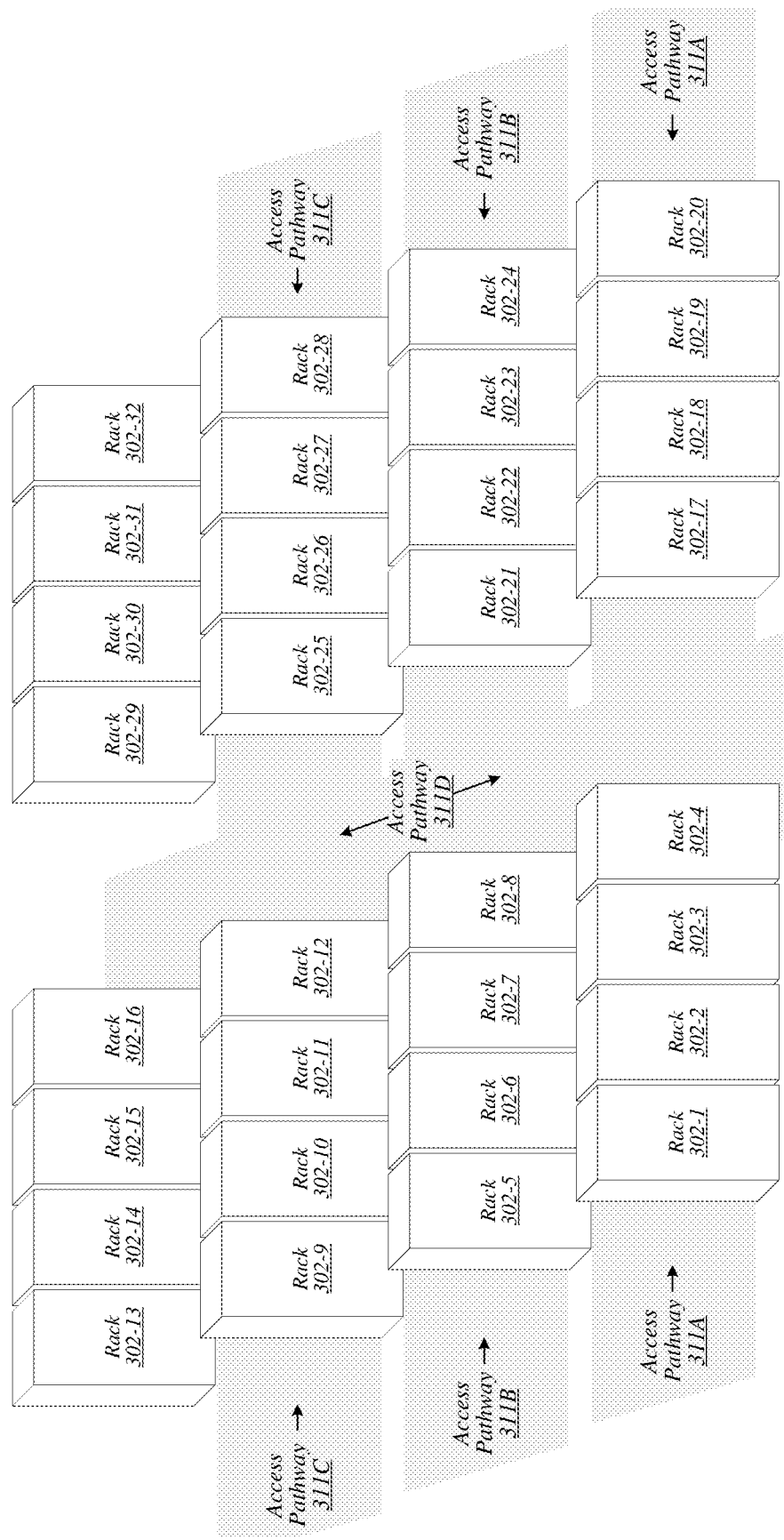
FIG. 3 illustrates an example of a data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
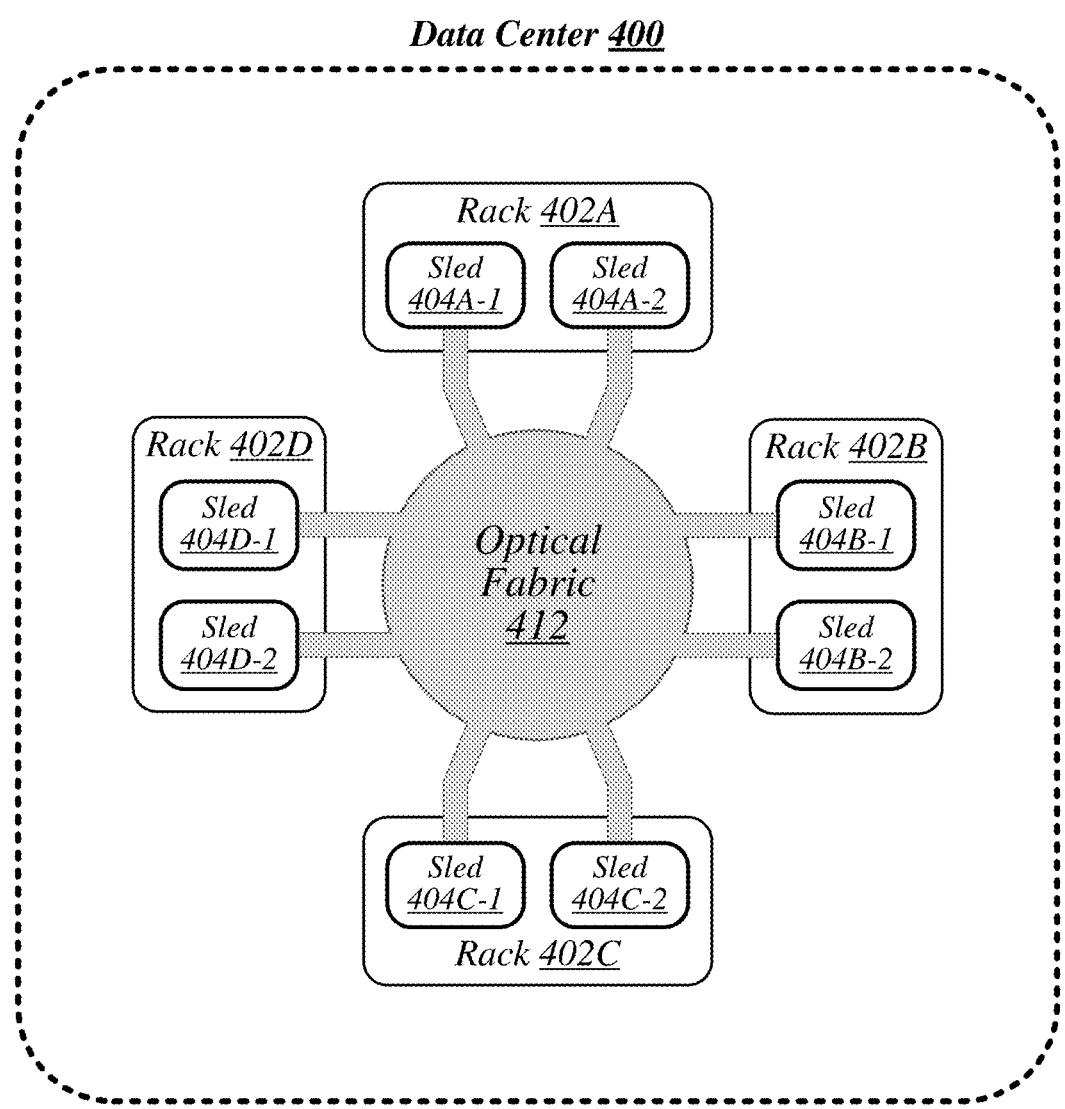
FIG. 4 illustrates an example of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
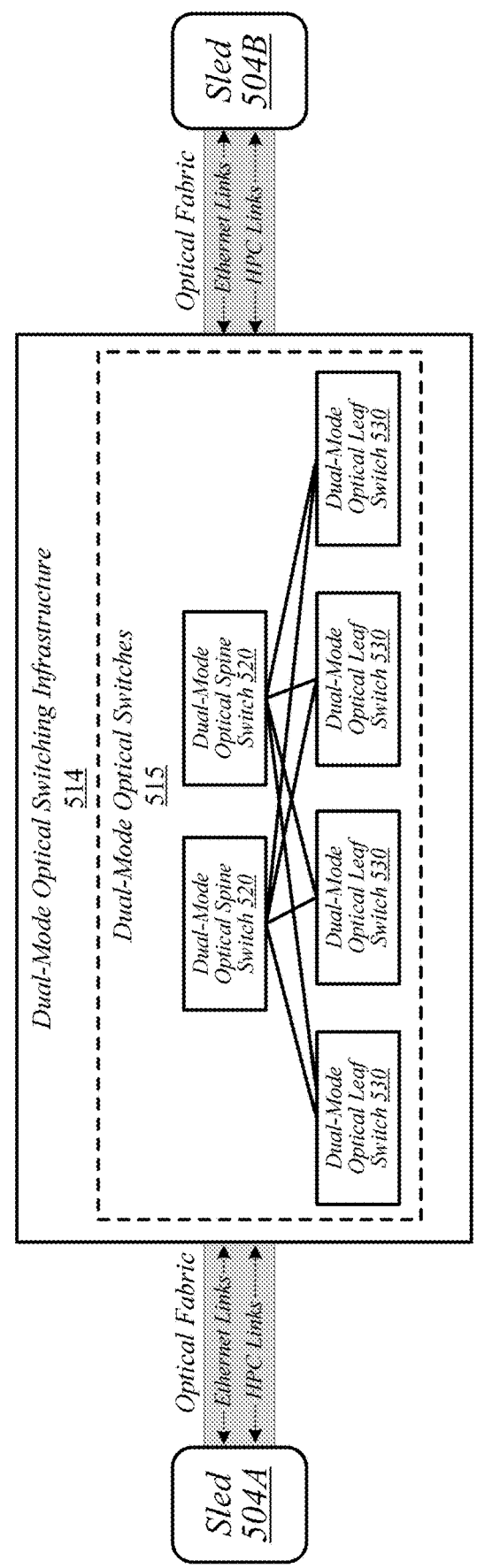
FIG. 5 illustrates an example of a switching infrastructure.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In embodiments, the dual-mode switch may be a single physical network wire that may be capable of carrying Ethernet or Onmi-Path communication, which may be auto-detected by the dual-mode optical switch 515 or configured by the Pod management controller. This allows for the same network to be used for Cloud traffic (Ethernet) or High Performance Computing (HPC), typically Onmi-Path or Infiniband. Moreover, and in some instances, an Onmi-Path protocol may carry Onmi-Path communication and Ethernet communication. In some embodiments, dual-mode optical switches 515 may constitute leaf switches 530 in a leaf-spine architecture additionally including one or more dual-mode optical spine switches 520. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
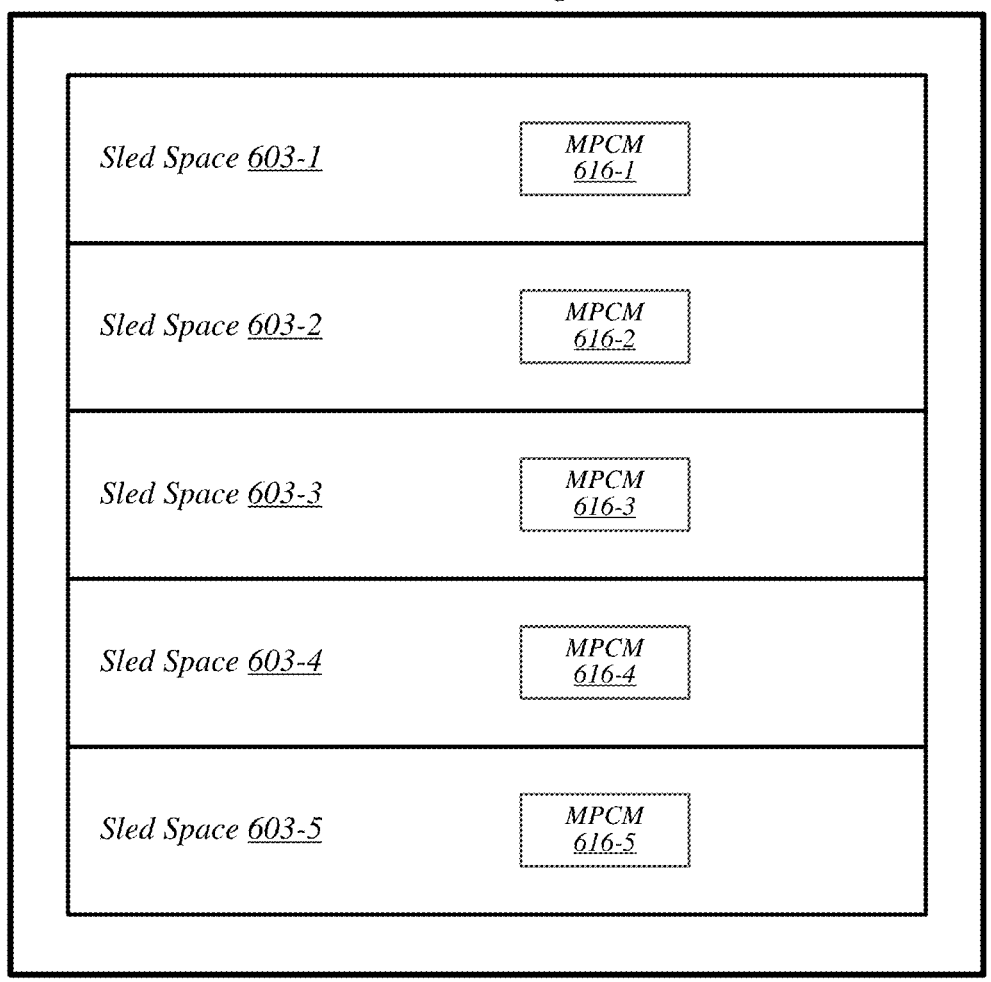
FIG. 6 illustrates and example of a data center.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Figure 7:
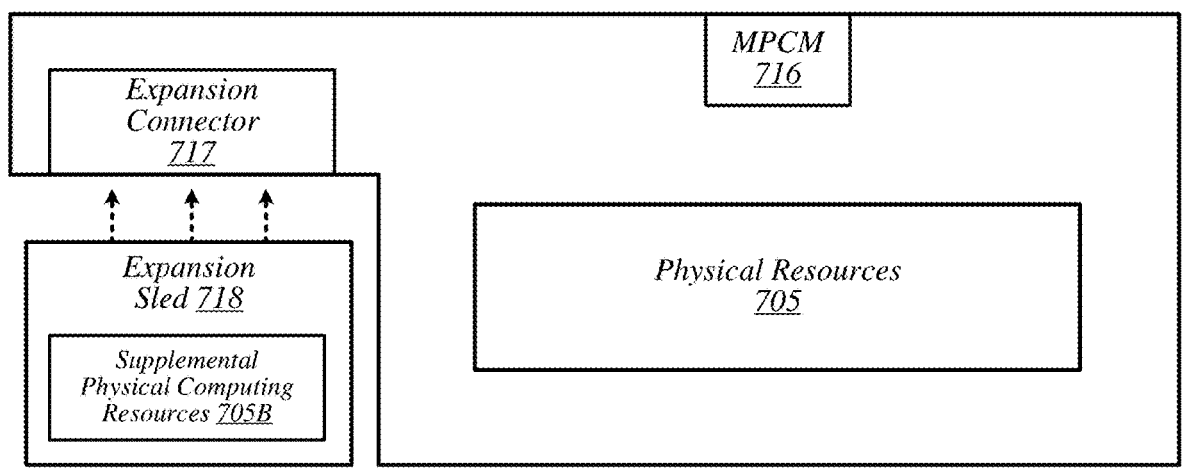
FIG. 7 illustrates an example of a sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
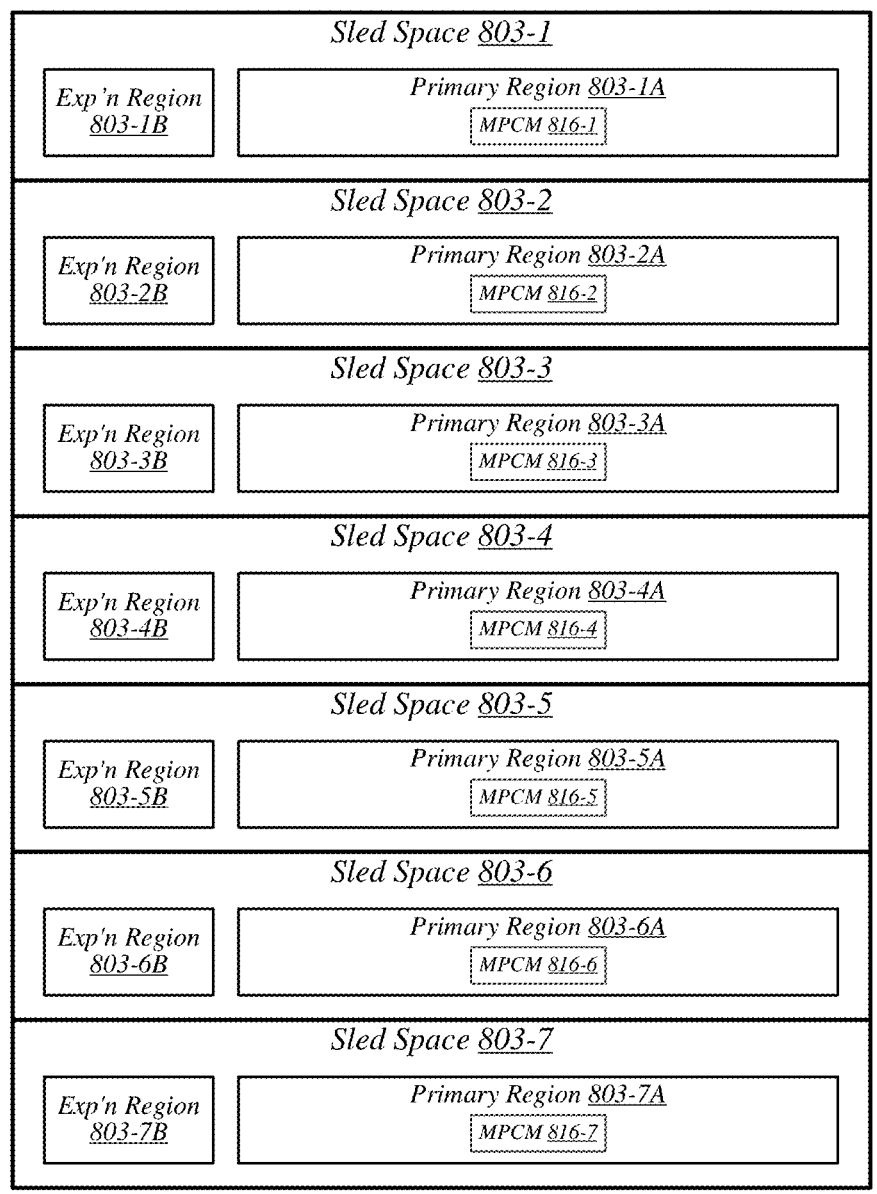
FIG. 8 illustrates an example of a data center.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
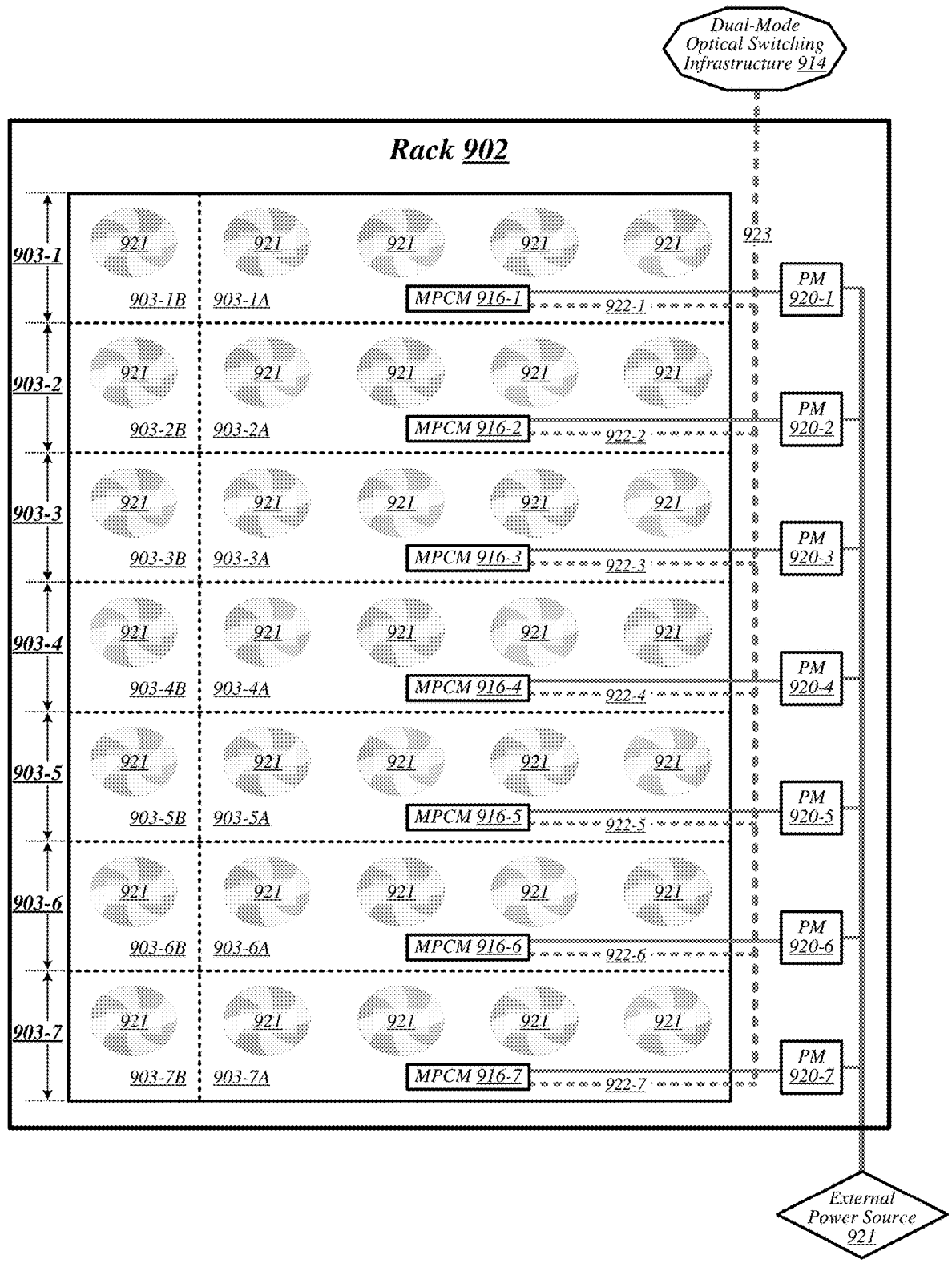
FIG. 9 illustrates an example of a data center.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
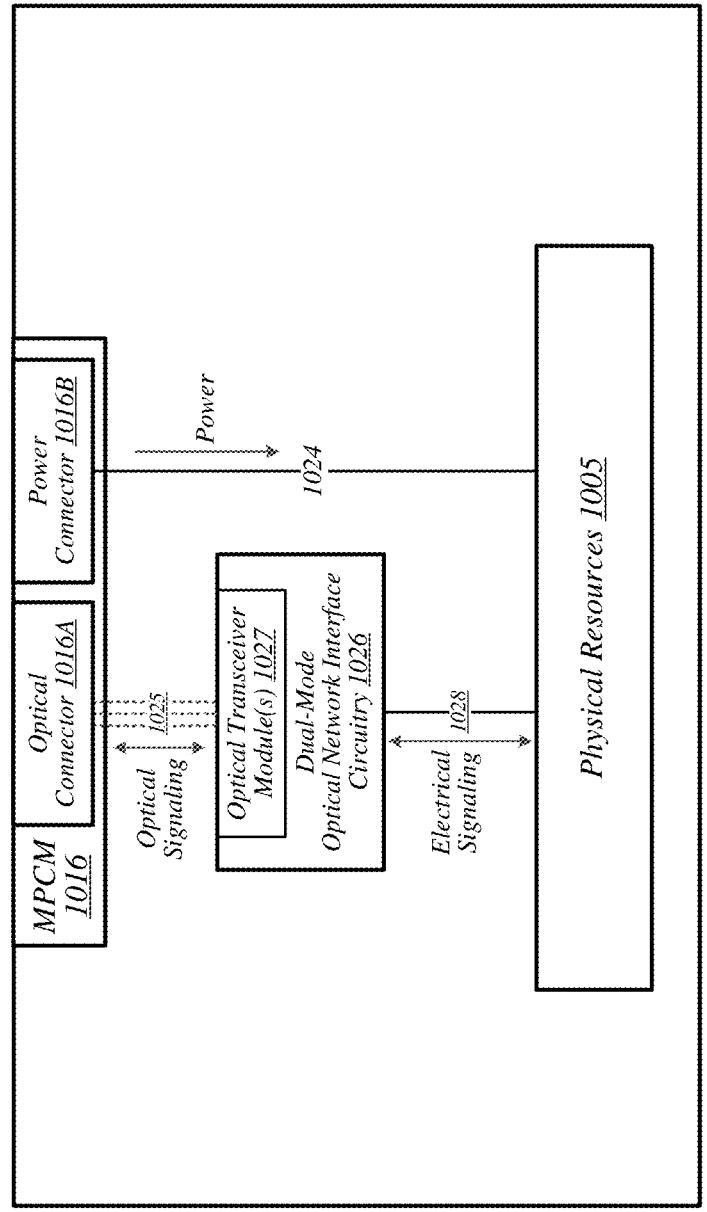
FIG. 10 illustrates an example of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
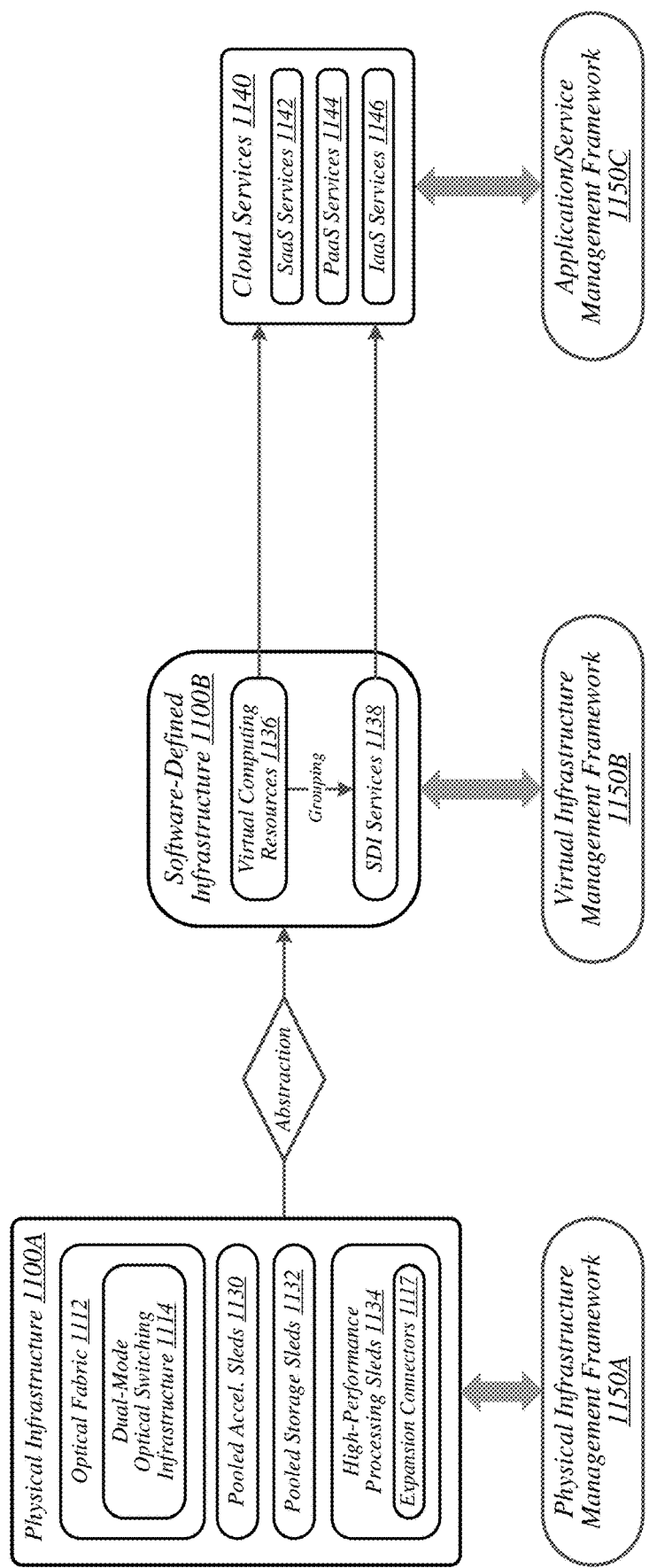
FIG. 11 illustrates an example of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
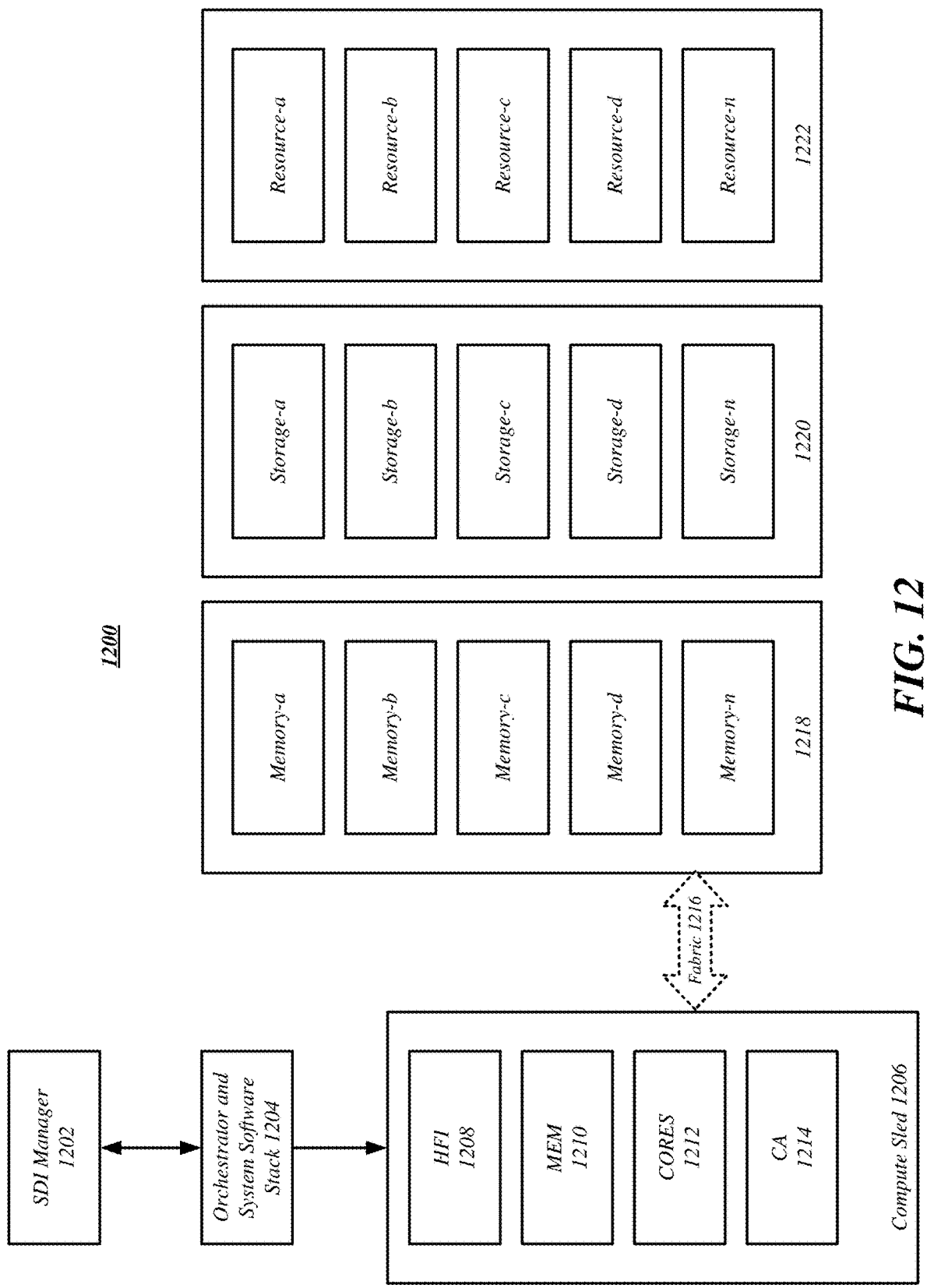
FIG. 12 illustrates a block diagram of a system according to an embodiment.

FIG. 12 illustrates a block diagram of a system according to an embodiment. System 1200 may be a SDI architecture, in which resources may be defined by applications, and composite nodes may be created from a set of available resources on an application-by-application basis. In some data centers, the resource selection and allocation for the application may be done by a resource manager, which may be operated separately from, or within, an orchestrator. Traditional architectures may be composed by a set of static platforms or nodes $Ns=\{N1, \ldots, Nm\}$ that the resource manager may allocate to the application based upon characteristics, properties, and/or requirements. Each node may include a set of resources with a certain characteristics (i.e., performance, capacity, etc.). The data center may be composed at the same time by different nodes with different types of resources, for example.

Forthcoming data center architectures may be based on SDI, such as the architecture illustrated in FIG. 12. In SDI architectures, applications may be executed on top of a composite node, which may be dynamically created by the SDI manager 1202 (i.e., a Rack Scale Design Pod Manager, in some exemplary embodiments), or created based upon user or application instructions in some embodiments. A Rack Scale Design may include a hardware architecture that includes the ability to dynamically compose physical hardware resources into the most optimal configuration (e.g., composed or composite node) for each workload using an open application programming interface standard. These composite nodes, which may be composed by different resources that are disaggregated from the platform and distributed in different parts of the data center, may be virtualized to the application and are shown as an isolated and "local" resource. In other words, resources may be physically spread out remotely from a computing platform and connected via a fabric, as described herein.

In general terms, SDI architectures may expose a set of pools of resources, such as memory pool 1218, storage pool 1220, and resource pool 1222, each comprising one or more nodes of a given resource, to the orchestrator 1204 and system software stack 1204. Orchestrator 1204, based on user requests or application requests, may request to SDI manager 1204 to compose a node based on those requirements. The composed node may be defined by SDI manager 1202, as described in detail herein, and returned to orchestrator 1204. Once a composed node is defined by SDI manager 1202 and received by orchestrator 1204, an application may be booted and deployed on the composed node, which may include one or more resources from a compute sled 1206 and one or more resources from memory pool 1218, storage pool 1220, and resource pool 1222, connected via fabric 1216. While three exemplary pools are illustrated, it can be appreciated that more or less pools may be used in various embodiments. Further, resource pool 1222 may include one or more data center resources, such as field-programmable gate arrays (FPGAs) or accelerators, for example. Compute sled 1206 may include one or more components, such as Host Fabric Interconnect/Interface (HFI) node 1208, MEM memory node 1210, CORES processing node 1212, and caching agent (CA) node 114, which may each be consistent with one or more of the embodiments described herein.

In an embodiment, CA node(s) 1214 may be the coherency agents within a node that process memory requests from the cores within the same node. Home Agents (HA) may be the node clusters that are responsible for processing memory requests from the CAs and may act as a home for part of the memory address space (one die may have multiple homes having a distributed address space mapping). Depending on the address space that requests are targeting, they may go to the same node's local memory, they may go the Unified Path Interconnect (UPI) agent (formerly called QPI or KTI) to route the request to the other processors within the same coherent domain or they may go to processors through the Host Fabric Interface (HFI) that are outside the coherent domain. All the processors connected through UPI may belong to the same coherent domain. One system may be composed by one or more coherent domains being all the coherent domains connected through fabric interconnect. For example high-performance computing systems (HPC) or data centers may be composed by N clusters or servers that can communicate with each other using fabric 1216. Using the fabric 1216, each coherent domain may expose some address regions to the other coherent domains. However, accesses between different coherent domains may not be coherent. Some techniques described herein may assume that a fabric interconnect is used, such as Omni-Path, as described herein, which may allow mapping address of memory ranges between different coherent domains.

An important feature of SDI architectures is the support of heterogeneity through the flexibility that node composition provides. The composability allows connecting compute sleds and the rest of the resources dynamically and differently every time a node is composed. Thereby, different compute resources (such as compute sleds with CPUs of type A or compute sleds with CPUs of type B) may use same disaggregated resources exposed by the pools (such as FPGA or memory). Despite this level of flexibility, current SDI solutions may not consider the possibility that composed nodes can change compute sleds during the execution of the application (migrating it to the new compute sled) while keeping the data and other application software resources in the disaggregated resources. This functionality may be especially relevant to allow applications start earlier in compute sleds with less throughput and then migrate them to more powerful nodes as they become available.

As example, current high-performance computing (HPC) data centers may have different type of nodes to provide a variety of computing capabilities. For example, a data center may have nodes with large amount of processors, nodes with large amount of memory, or other combinations of particular resources. In many situations, jobs submitted by users may wait from several hours to several weeks before they get access to the requested compute resource.

Techniques described herein include components (logic and/or hardware) within an SDI manager to address the problem stated above. This logic may provide an interface that communicates to the orchestrator the target compute sled type as well as a list of compute sled types that may be used while the target one is not available. If no compute sleds of the targeted type are available, the SDI manager may compose a node with one of the alternative compute sled types. Once a compute sled matching the requirements of the application is released, the application may be hibernated and migrated to the desired compute sled. Before resuming the application in the new compute sled, the SDI manager may reconnect the disaggregated resource to the new compute sled.

An exemplary benefit of this technique is that most or all of the data or software resources instantiated on the disaggregated resources may remain in the disaggregated resources. Thus, the application or software does not need to migrate or move. For example, if the application was writing metadata in a disk of the storage pool, the data will be still available to the application by the fact that the disk is re-connected to the new compute sled. The technique assumes that virtualization is used as a means to hibernate and resume the application. The techniques described herein may disconnect disaggregated resources from one compute sled and reconnect it to a new compute sleds with different capabilities when it becomes available transparently to the software stack. The orchestrator may not need to manage the migration since the policy may allow for abstraction of the complexity of the underlying SDI architecture and how the migration and resource management is performed. Rather, automatic migration logic, described herein, tracks and selects what compute sleds are using and how they are connected to disaggregated resources. This may facilitate the integration of this functionality to a wider range of data centers, reducing the impact to their existing policies and resource stack.

Figure 13:
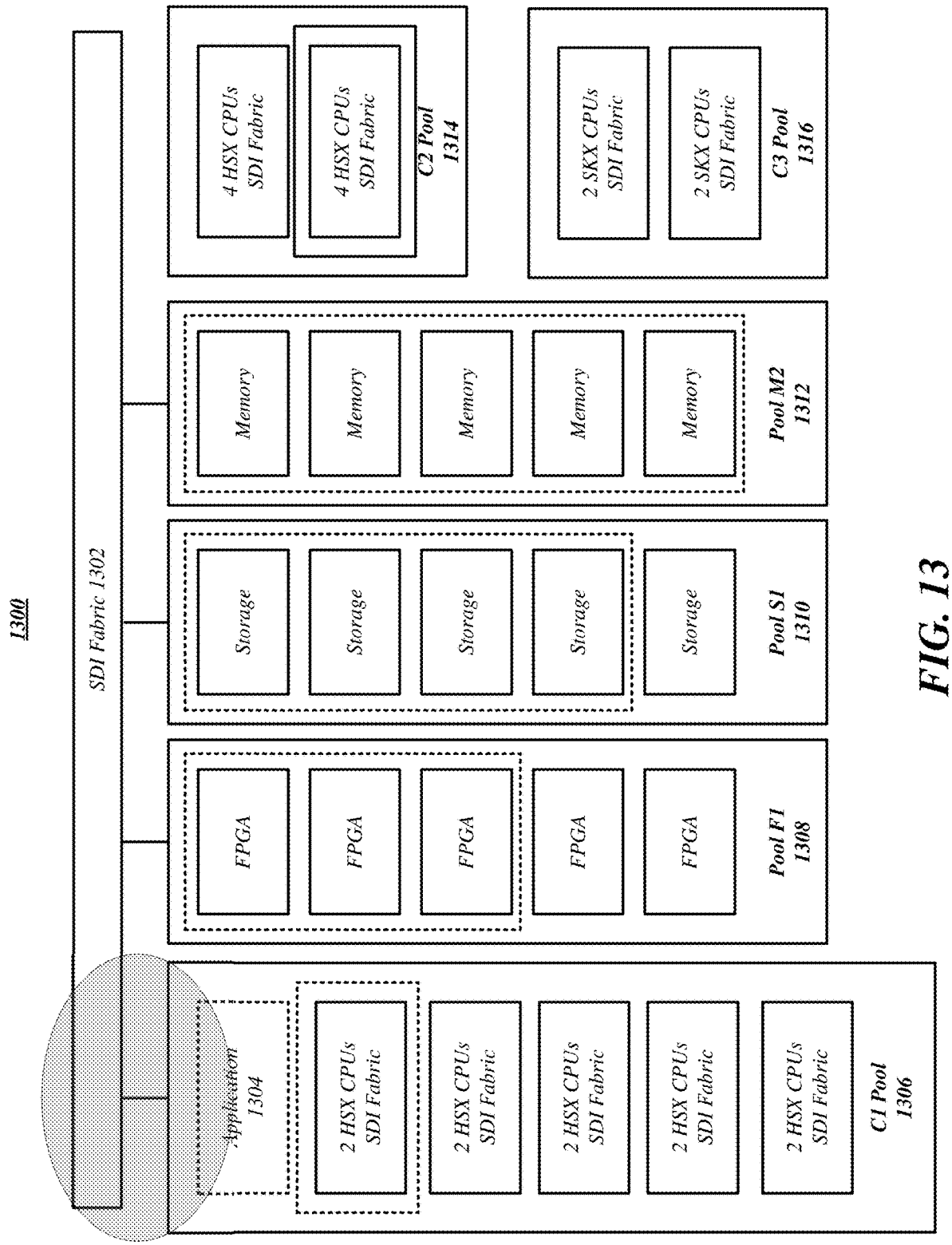
FIG. 13 illustrates a block diagram of a system according to an embodiment.
Figure 14:
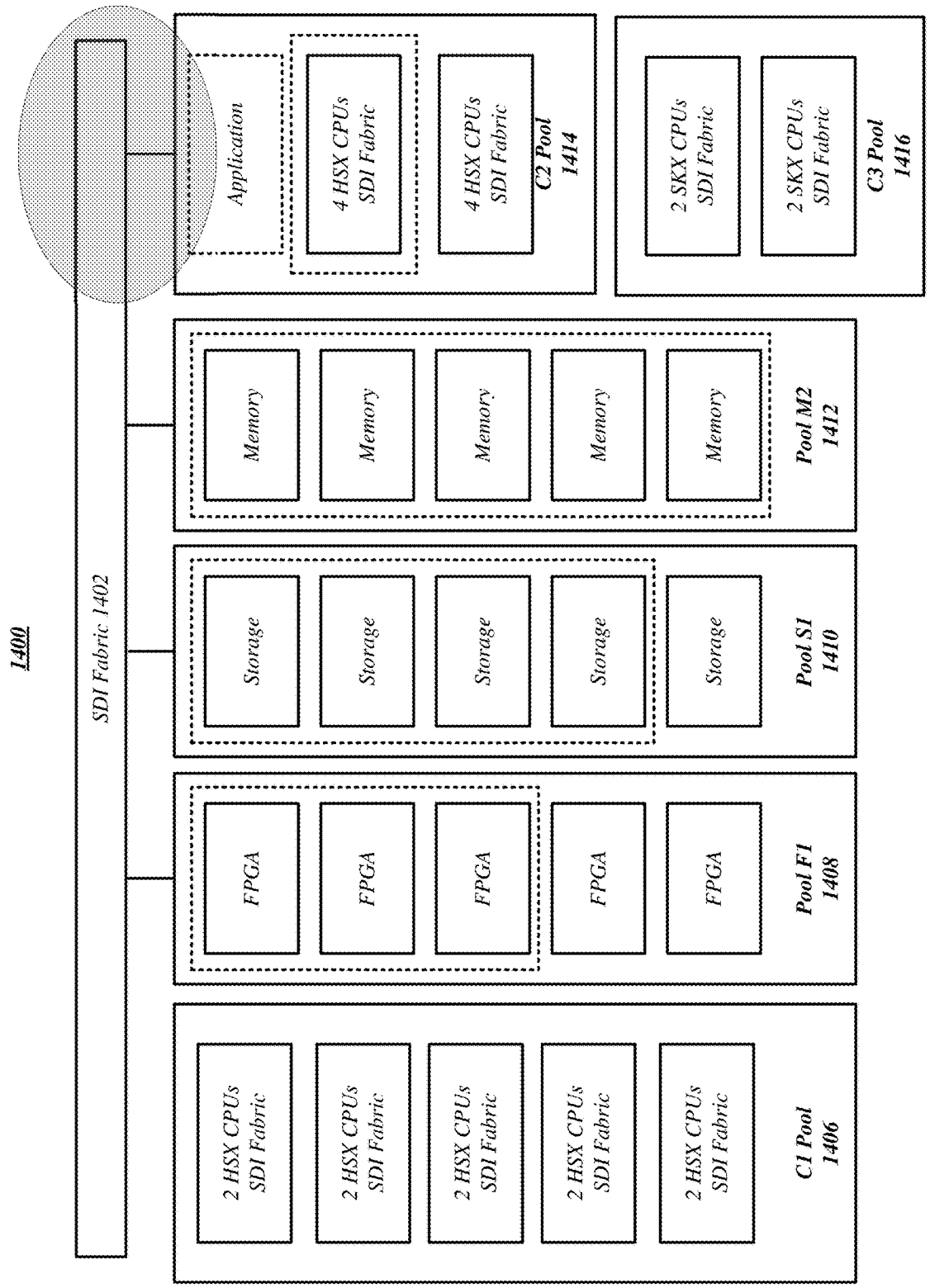
FIG. 14 illustrates a block diagram of a system according to an embodiment.

FIGS. 13 and 14 illustrate block diagrams of a system according to an embodiment. As illustrated, an SDI fabric 1302/1402 may be used to connect one or more compute sleds 1306/1406, 1314/1414, 1316/1416 with one or more resources 1308/1408, 1310/1410, and 1312/1412. It can be appreciated that more or less compute sleds and resources may be used in various embodiments. In FIG. 13, compute sled 1306 is connected, via the shaded portion, to the resources, creating a composed node to run application 1304. However, it may be desired for application 1304 to run on compute sled 1314. Thus, in an embodiment, once compute sled 1314 becomes available, migration logic may send an interrupt to the software stack to hibernate the application. Once hibernation is complete, an indication may be created by compute sled 1306, the SDI manager may migrate the application image to the new compute sled 1314/1414, reconnect resources from pools 1308/1408, 1310/1410, and 1312/1412, and resume the application, illustrated by application 1404 connected via the highlighted portion in FIG. 14. This flow is also represented within FIG. 17.

Figure 15:
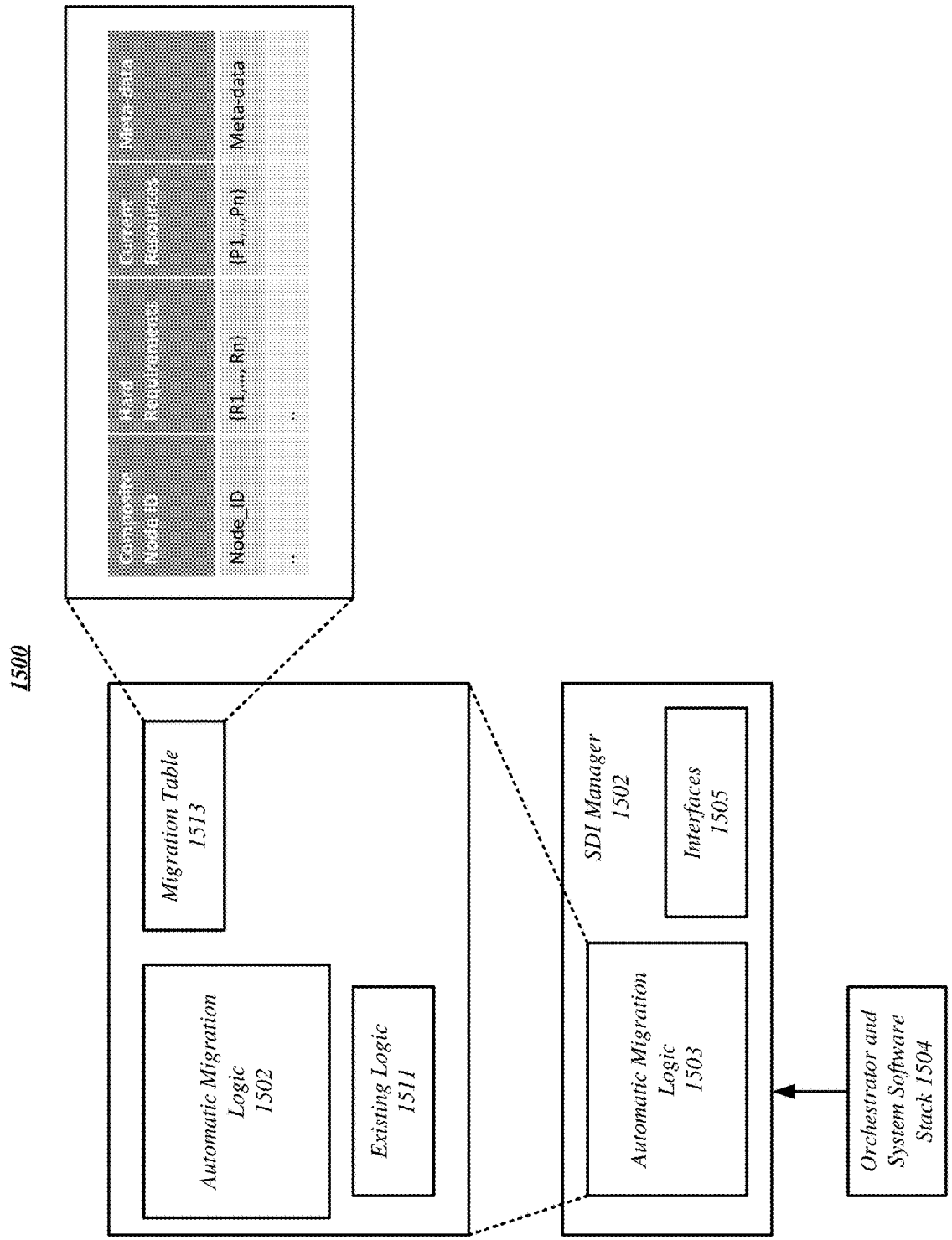
FIG. 15 illustrates a block diagram of a system according to an embodiment.

FIG. 15 illustrates a block diagram of a system according to an embodiment. As illustrated within FIG. 15, SDI manager 1502 may include an interface 1505, which may be configured to accept from orchestrator 1504 preferred and alternative compute sled types. For example, an application may wish to run on a certain type of compute sled, however, another type of compute sled may be satisfactory. In this manner, when a preferred compute sled type is unavailable, the application may be able to run sooner on an alternative compute sled, and then migrate to the preferred sled when available.

In some embodiments, SDI manager 1502 may include automatic migration logic 1503, which may be configured to perform the logic flow discussed above and illustrated within FIG. 17. Automatic migration logic 1502 may be configured to manage composite nodes that need to be re-composed, as well as the logic flows required to interact with the compute sleds to perform the migration. This may include interaction with one or more compute sleds, so that preferred compute sleds may indicate they are available for an automatic migration. The interaction with one or more compute sleds may include model-specific registers (MSRS) and memory-mapped I/O (MMIO) addresses used to coordinate between the system stack or hypervisor and one or more compute sleds to coordinate application hibernation and resuming applications once migration is complete.

Automatic migration logic 1502 may include migration table 1513, which may contain a list of composite nodes that need to be recomposed with a new compute sled when it becomes available. Migration table 1513 may include, among other information, a composite node ID, hard requirements, current resources, and additional metadata relevant to the automatic migration techniques described herein. At submission time, the orchestrator 1504 may specify a list of hard compute requirements (such as performance, power, ISA, etc.) that may be used to identify which compute sleds are the final target for a composite node. The hard requirements may represent a preferred compute sled configuration. The orchestrator 1504 may also specify a set of compute requirements that can be used to select a pre-compute sled in case that there are not compute sleds satisfying the hard requirements, constituting an alternative compute sled configuration.

In an embodiment, the system software stack may be extended to implement the flows with the compute sled, including support for process interrupts, ring bells, alerts, etc. Further, in some embodiments, the hibernated application may be stored within a specific region of the disaggregated memory to allow fast migration. The system stack running in the new compute sled may access to a pre-defined MSR to locate to what part region of memory the image is stored and can quickly access to it. This "fast migration" feature may be enabled when memory is disaggregated from the compute sled. If memory is not disaggregated from the compute sled, a similar process may be done over disaggregated storage.

Figure 16:
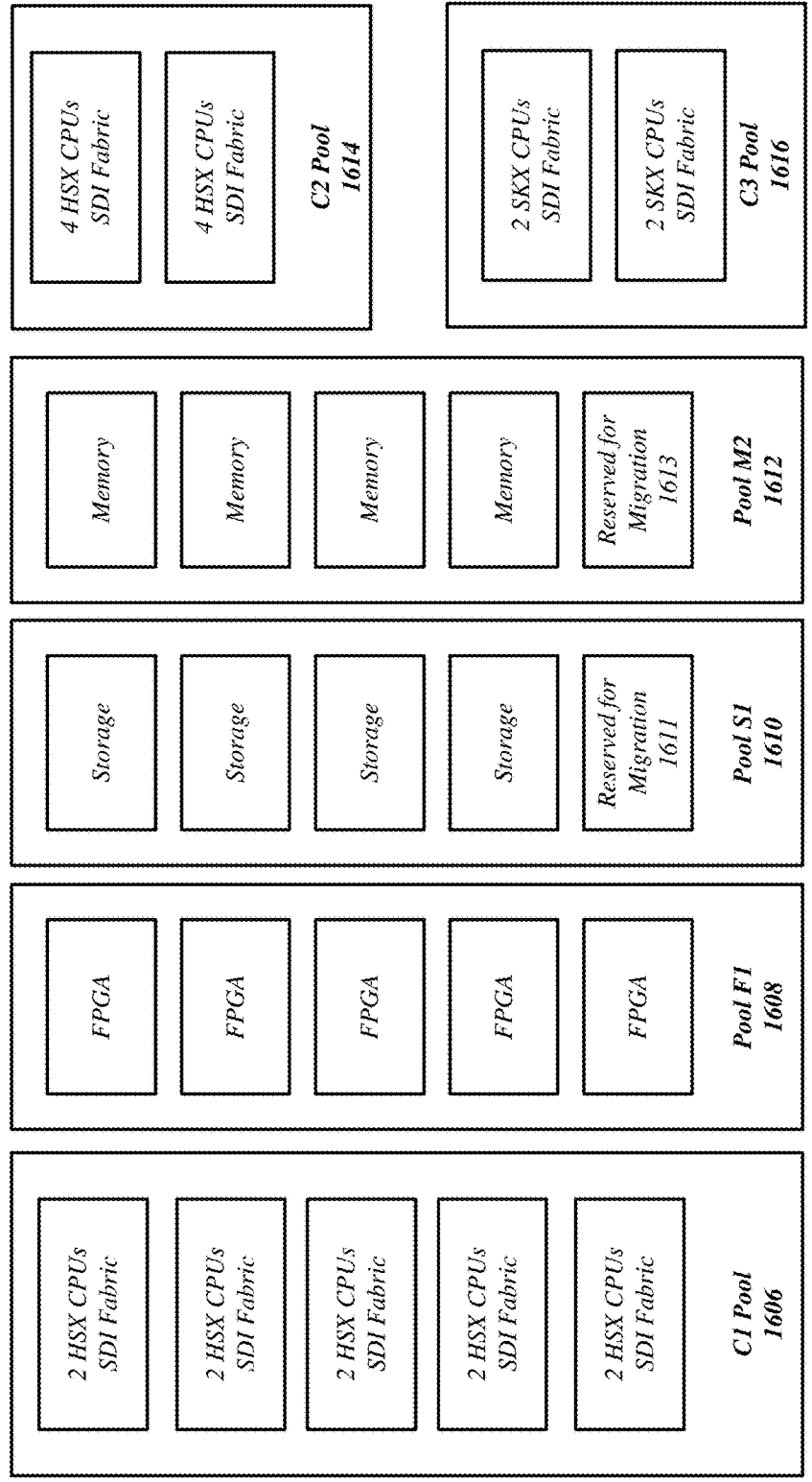
FIG. 16 illustrates a block diagram of a system according to an embodiment.

FIG. 16 illustrates a block diagram of a 1600 system according to an embodiment. System 1600 illustrates one optimization according to an embodiment. This optimization may include elements similar and like-numbered to FIGS. 13 and 14, but may additionally include one or more reserved memory and/or storage locations, such as reservation locations 1611 and 1613. These reserved locations may be configured to store the hibernated application in a specific region of the disaggregated memory to allow fast migration. This "fast migration" feature may be enabled when memory is disaggregated from the compute sled. If memory is not disaggregated from the compute sled, a similar process may be performed over disaggregated storage. To allow the usage of memory or storage as main a mechanism to hibernate and resume the application (virtual machine), the new migration logic may be responsible to reserve a certain region of the storage and memory pools to be used as scratch path.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 17:
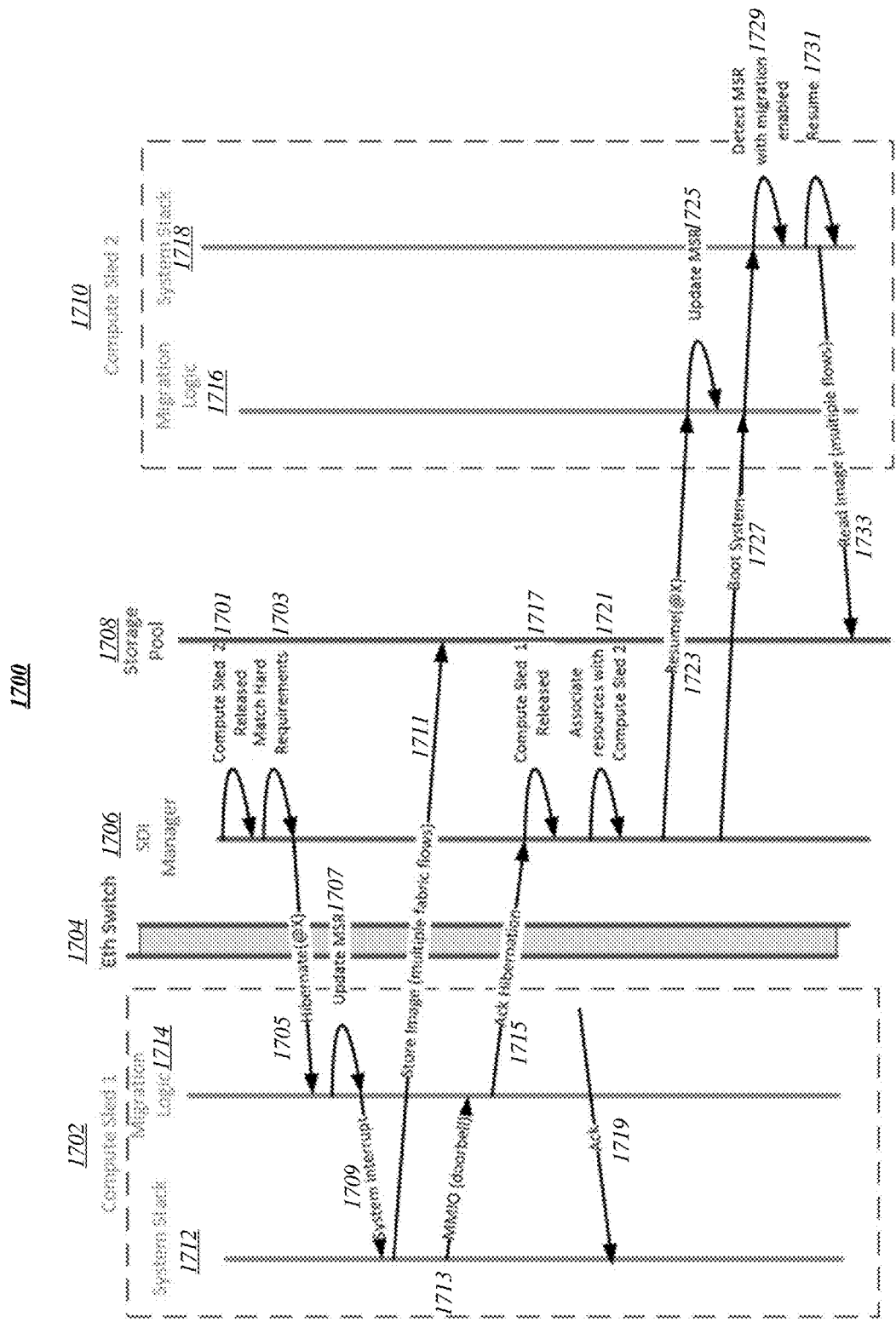
FIG. 17 illustrates a logic flow according to an embodiment.

FIG. 17 illustrates a logic flow 1700 according to an embodiment. In some embodiments, logic within the host fabric interconnect 1704, or other part of the platform, may be configured to facilitate the transparent automatic migration process described herein. This logic may be responsible for processing requests from an SDI manager 1706 to start a hibernation, or to resume an application once migration is complete. The logic may utilize pre-defined memory locations (such as MSRs) and/or system interrupts to perform the described process, in some examples. Further, the system software stack/orchestrator 1712/1718 may be extended with one or more changed to implement the hibernation and resume flow described herein and illustrated within FIG. 17. The system software stack/orchestrator 1712/1718 may be configured to discover where a migrated image is stored using a set of pre-defined MSRs, in some embodiments.

Logic flow 1700, illustrated within FIG. 17, may be representative of one embodiment of an automatic migration process. The system may include a plurality of compute sleds 1702/1710, each with different resource characteristics. Each compute sled may include a system stack and migration logic (1712/1714, 1716, 1718), which may be configured to interface with SDI manager to perform the migration techniques described herein. The SDI system may be connected via fabric 1704, and may include storage pool 1708, which may be disaggregated from both compute sled 1702 and compute sled 1710.

Prior to logic flow 1700, the orchestrator of an SDI system may submit a request to the SDI manager 1706 to create a composite node with the hard compute requirements as well as the alternative requirements. Assuming no compute sleds are available that satisfy the hard requirements, the SDI manager 1706 may create a composite node using a compute sled 1702 that satisfies the alternative requirements, also received from the orchestrator. At 1701/1703, a compute sled 1710 matching the hard compute requirements may become available. The SDI manager 1706 may notify to the compute sled 1702 via fabric 1704 to start the hibernation process. The SDI manager 1706 may provide an address (either storage or memory) of where to store the image (here it is assumed that using the requirements the SDI manager can extrapolate the space needed) at 1707. Note that memory may not need to be stored if already placed in a pool. The logic in the compute sled may store this address in a new machine state register MSR_ST_ADDR and may generate a system interrupt at 1709.

One a system interrupt has been issued, the operating system may read or the hypervisor hibernates the application (virtual machine) using the address specified in the MSR at 611. Once the hibernation is done, the system may write in a MMIO address that generates a doorbell to the new logic in the compute sled at 1713. The logic may contact to the SDI Manager to notify that hibernation finished at 1715. At 1717, the SDI manager 1706 may release the old compute sled 1702, which is acknowledged at 1719, and assemble the associated disaggregated resources to the new compute sled 1710 at 1721. Once the assembly is done and the SDI manager 1706 writes an address in the MSR_ST_ADDR of the new compute sled the address where the image is stored at 1723 and 1725. Also a MSR called MSR_MIGRATE may be written to 1, or other flag, to notify that to the system stack or hibernation that the application needs to be resumed from MSR_ST_ADDR. The software stack may then be booted at 1727, the written flag may be detected at 1729, and at 1731 compute sled 1710 may resume the application, reading the image from disaggregated storage pool 1708 at 1733.

Figure 18:
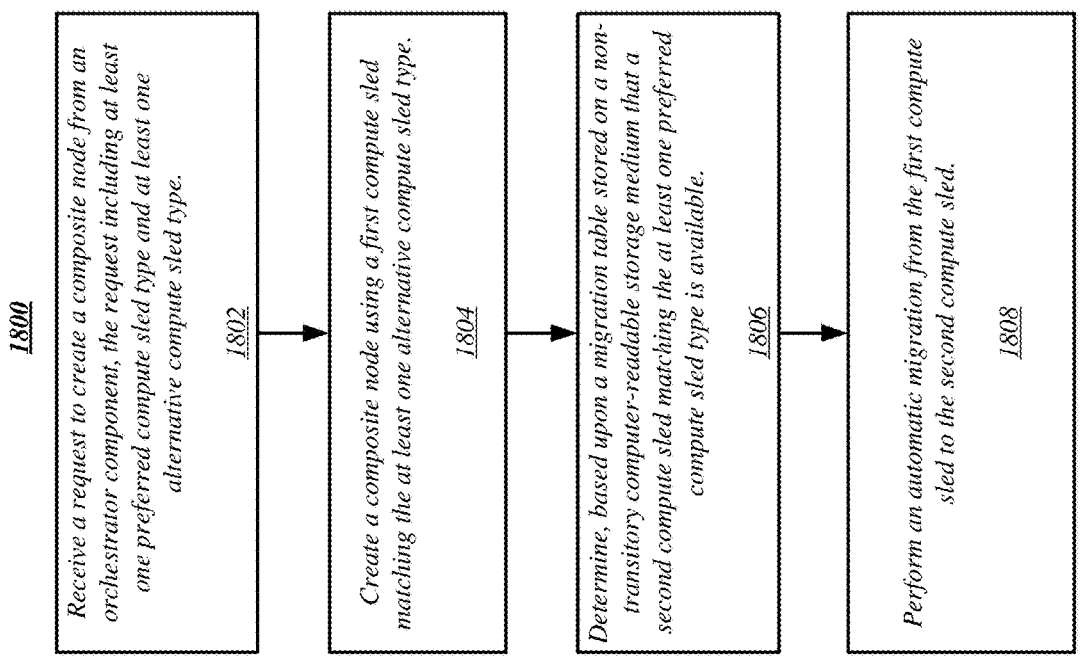
FIG. 18 illustrates a logic flow according to an embodiment.

FIG. 18 illustrates a logic flow 1800 according to an embodiment. 1. In an embodiment, a SDI system may include a SDI manager component, which may include one or more processor circuits, configured to access one or more remote resources, as described herein. At 1802, the SDI manager component may include a partition manager configured to receive a request to create a composite node from an orchestrator component, the request including at least one preferred compute sled type and at least one alternative compute sled type. As described herein an application may require an ideal resource configuration of a compute sled, which may be identified as a preferred compute sled type. This may include certain processor, memory, latency, bandwidth, or other computing requirements. However, in order to begin execution faster, when a preferred compute sled is unavailable, an application may identify to an orchestrator of an SDI system an alternative compute sled configuration that will suffice until a preferred configuration becomes available. The alternative compute sled configuration may be different than the preferred compute sled configuration.

At 1804, in a case where a preferred compute sled configuration is unavailable, an SDI manager may create a composite node using a first compute sled matching the at least one alternative compute sled type. An application may execute using the alternative compute sled type for a period of time until, at 1806, it is determined that, based upon a migration table stored on a non-transitory computer-readable storage medium that a second compute sled matching the at least one preferred compute sled type is available.

At 1808, the SDI manager may perform an automatic migration from the first, alternative compute sled, to a second preferred compute sled. During the automatic migration, at least one application executing on the first compute sled may be placed into hibernation based upon an instruction to the compute sled from the SDI manager. Data necessary to the application may be already stored on a disaggregated storage device, separate from both the preferred compute sled and the alternative compute sled. In some embodiments, the use of disaggregated storage is a prerequisite for automatic migration, and the SDI system may identify the presence of disaggregated storage. The memory location or address of the application data within disaggregated storage may be stored within designated registers or storage locations of a compute sled, or other resources. In this manner, software running on the compute sled can easily access the data after a migration is complete, and an SDI manager knows where to update address information during a migration, and may send such information to a new compute sled during the process.

In some embodiments, when a migration has completed successfully, the SDI manager component may be configured to receive an indication of the same. The SDI manager may release the first compute sled upon receiving the indication when the automatic migration has finished, and reassign resources previously used by the first compute sled to a new compute sled after the first compute sled has been released.

Figure 19:
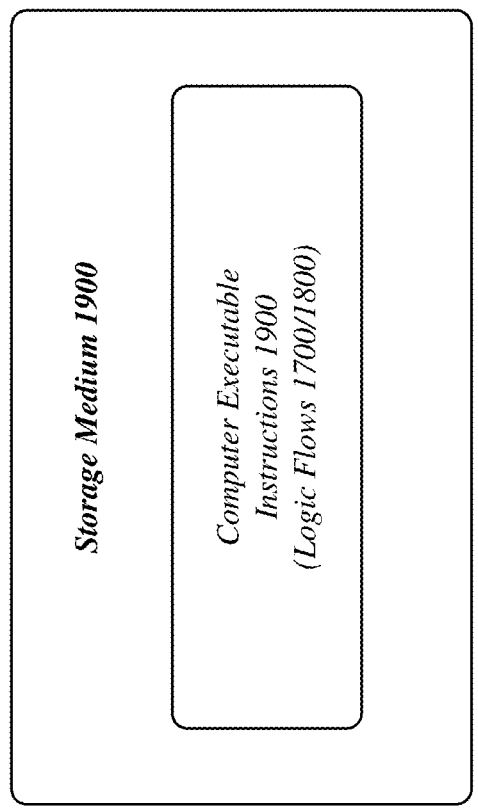
FIG. 19 illustrates an embodiment of computer-readable storage medium.

FIG. 19 illustrates an embodiment of a storage medium 1900. The storage medium 1900 may comprise an article of manufacture. In some examples, the storage medium 1900 may include any non-transitory computer readable medium or machine readable medium, such as an optical, magnetic or semiconductor storage. The storage medium 1900 may store various types of computer executable instructions e.g., 1902). For example, the storage medium 1900 may store various types of computer executable instructions to implement logic flows described herein using one or more processors and components described herein, such as logic flows 1700 and/or 1800.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

The various elements of the devices described herein may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the disclosure.

Example 1

A software-defined infrastructure (SDI) system, comprising: an SDI manager component, including one or more processor circuits to access one or more remote resources, the SDI manager component including a partition manager to: receive a request to create a composite node from an orchestrator component, the request including at least one preferred compute sled type and at least one alternative compute sled type; create a composite node using a first compute sled matching the at least one alternative compute sled type; receive an indication that a second compute sled has become available; determine that the second compute sled matches the at least one preferred compute sled type; and perform a migration from the first compute sled to the second compute sled.

Example 2

The system of Example 1, wherein the at least one alternative compute sled type is defined by a set of compute requirements different than a set of compute requirements defining the least one preferred compute sled type.

Example 3

The system of Example 1, wherein the migration includes hibernating at least one application executing on the first compute sled in response to an interrupt.

Example 4

The system of Example 3, wherein the hibernated at least one application is stored within a designated disaggregated portion of the at least one or more remote resources.

Example 5

The system of Example 4, wherein the second compute sled determines a memory location of the hibernated at least one application based upon a pre-defined memory location reserved for migration operations.

Example 6

The system of Example 5, wherein the second compute node determines a memory location of the hibernated at least one application based upon a message from the SDI manager component.

Example 7

The system of Example 1, wherein the SDI manager component is configured to receive an indication when the migration has finished.

Example 8

The system of Example 7, wherein the SDI manager component is configured to release the first compute sled upon receiving the indication when the migration has finished.

Example 9

The system of Example 1, wherein the determination is based upon a migration table stored on a non-transitory computer-readable storage medium.

Example 10

The system of Example 1, wherein the ability to perform a migration is dependent upon the use of memory disaggregated from the first or second compute sled.

Example 11

A computer-implemented method, comprising: receiving, by an SDI manager component, a request to create a composite node from an orchestrator component, the request including at least one preferred compute sled type and at least one alternative compute sled type; creating a composite node using a first compute sled matching the at least one alternative compute sled type; receive an indication that a second compute sled has become available; determine that the second compute sled matches the at least one preferred compute sled type; and performing a migration from the first compute sled to the second compute sled.

Example 12

The method of Example 11, wherein the at least one alternative compute sled type is defined by a set of compute requirements different than a set of compute requirements defining the least one preferred compute sled type.

Example 13

The method of Example 11, wherein the migration includes hibernating at least one application executing on the first compute sled in response to an interrupt.

Example 14

The method of Example 13, wherein the hibernated at least one application is stored within a designated disaggregated portion of the at least one or more remote resources.

Example 15

The method of Example 14, wherein the second compute sled determines a memory location of the hibernated at least one application based upon a pre-defined memory location reserved for migration operations.

Example 16

The method of Example 15, wherein the second compute node determines a memory location of the hibernated at least one application based upon a message from the SDI manager component.

Example 17

The method of Example 11, wherein the SDI manager component is configured to receive an indication when the migration has finished.

Example 18

The method of Example 17, wherein the SDI manager component is configured to release the first compute sled upon receiving the indication when the migration has finished.

Example 19

The method of Example 11, wherein the determination is based upon a migration table stored on a non-transitory computer-readable storage medium.

Example 20

The method of Example 11, wherein the ability to perform a migration is dependent upon the use of memory disaggregated from the first or second compute sled.

Example 21

A non-transitory computer-readable storage medium that stores instructions for execution by processing circuitry of a software-defined infrastructure (SDI) system, the instructions to cause a SDI manager component of the SDI system to: receive a request to create a composite node from an orchestrator component, the request including at least one preferred compute sled type and at least one alternative compute sled type; create a composite node using a first compute sled matching the at least one alternative compute sled type; receive an indication that a second compute sled has become available; determine that the second compute sled matches the at least one preferred compute sled type; and perform a migration from the first compute sled to the second compute sled.

Example 22

The non-transitory computer-readable storage medium of Example 21, wherein the at least one alternative compute sled type is defined by a set of compute requirements different than a set of compute requirements defining the least one preferred compute sled type.

Example 23

The non-transitory computer-readable storage medium of Example 21, wherein the migration includes hibernating at least one application executing on the first compute sled in response to an interrupt.

Example 24

The non-transitory computer-readable storage medium of Example 23, wherein the hibernated at least one application is stored within a designated disaggregated portion of the at least one or more remote resources.

Example 25

The non-transitory computer-readable storage medium of Example 24, wherein the second compute sled determines a memory location of the hibernated at least one application based upon a pre-defined memory location reserved for migration operations.

Example 26

The non-transitory computer-readable storage medium of Example 25, wherein the second compute node determines a memory location of the hibernated at least one application based upon a message from the SDI manager component.

Example 27

The non-transitory computer-readable storage medium of Example 21, wherein the SDI manager component is configured to receive an indication when the migration has finished.

Example 28

The non-transitory computer-readable storage medium of Example 27, wherein the SDI manager component is configured to release the first compute sled upon receiving the indication when the migration has finished.

Example 29

The non-transitory computer-readable storage medium of Example 21, wherein the determination is based upon a migration table stored on a non-transitory computer-readable storage medium.

Example 30

The non-transitory computer-readable storage medium of Example 21, wherein the ability to perform a migration is dependent upon the use of memory disaggregated from the first or second compute sled.

Example 31

A software-defined infrastructure (SDI) system, comprising: means for receiving a request to create a composite node, the request including at least one preferred compute sled type and at least one alternative compute sled type; means for creating a composite node using a first compute sled matching the at least one alternative compute sled type; means for receiving an indication that a second compute sled has become available; means for determining that the second compute sled matches the at least one preferred compute sled type; and means for migrating an application from the first compute sled to the second compute sled.

Example 32

The system of Example 31, wherein the at least one alternative compute sled type is defined by a set of compute requirements different than a set of compute requirements defining the least one preferred compute sled type.

Example 33

The system of Example 31, wherein the migration includes hibernating at least one application executing on the first compute sled in response to an interrupt.

Example 34

The system of Example 33, wherein the hibernated at least one application is stored within a designated disaggregated portion of the at least one or more remote resources.

Example 35

The system of Example 34, wherein the second compute sled determines a memory location of the hibernated at least one application based upon a pre-defined memory location reserved for migration operations.

Example 36

The system of Example 35, wherein the second compute node determines a memory location of the hibernated at least one application based upon a message from the SDI manager component.

Example 37

The system of Example 31, further comprising means for receiving an indication when the migration has finished.

Example 38

The system of Example 37, further comprising means for releasing the first compute sled upon receiving the indication when the migration has finished.

Example 39

The system of Example 31, wherein the determination is based upon a migration table stored on a non-transitory computer-readable storage medium.

Example 40

The system of Example 31, wherein the ability to perform a migration is dependent upon the use of memory disaggregated from the first or second compute sled.

Example 41

An apparatus, comprising: at least one memory; at least one processor; and logic, at least a portion of the logic comprised in hardware and executed by the at least one processor, the logic to: receive, by an SDI manager component, a request to create a composite node from an orchestrator component, the request including at least one preferred compute sled type and at least one alternative compute sled type; create a composite node using a first compute sled matching the at least one alternative compute sled type; receive an indication that a second compute sled has become available; determine that the second compute sled matches the at least one preferred compute sled type; and determine, based upon a migration table stored on a non-transitory computer-readable storage medium that a second compute sled matching the at least one preferred compute sled type is available; and perform a migration from the first compute sled to the second compute sled.

Example 42

The apparatus of Example 41, wherein the at least one alternative compute sled type is defined by a set of compute requirements different than a set of compute requirements defining the least one preferred compute sled type.

Example 43

The apparatus of Example 41, wherein the migration includes hibernating at least one application executing on the first compute sled in response to an interrupt.

Example 44

The apparatus of Example 43, wherein the hibernated at least one application is stored within a designated disaggregated portion of the at least one or more remote resources.

Example 45

The apparatus of Example 44, wherein the second compute sled determines a memory location of the hibernated at least one application based upon a pre-defined memory location reserved for migration operations.

Example 46

The apparatus of Example 45, wherein the second compute node determines a memory location of the hibernated at least one application based upon a message from the SDI manager component.

Example 47

The apparatus of Example 41, wherein the SDI manager component is configured to receive an indication when the migration has finished.

Example 48

The apparatus of Example 47, wherein the SDI manager component is configured to release the first compute sled upon receiving the indication when the migration has finished.

Example 49

The apparatus of Example 41, wherein the determination is based upon a migration table stored on a non-transitory computer-readable storage medium.

Example 50

The apparatus of Example 41, wherein the ability to perform a migration is dependent upon the use of memory disaggregated from the first or second compute sled.

The invention claimed is:
1. A software-defined infrastructure (SDI) system, comprising:
a processor circuit operable to execute one or more instructions, that when executed by the processor circuit, cause the processor circuit to:
receive a request to create a composite node, the request to specify an application to be executed on the composite node, a preferred compute resource type for the composite node, and an alternative compute resource type for the composite node, wherein the alternative compute resource type is to be defined by a first set of compute resource requirements, wherein the preferred compute resource type is to be defined by a second set of compute resource requirements, wherein the second set of compute resource requirements is to comprise a greater amount of compute resources than the first set of compute resource requirements;
create the composite node using a first compute resource of the alternative compute resource type, the first compute resource of the composite node to execute the application;

receive an indication that a second compute resource of the preferred compute resource type has become available;

hibernate the application executing on the first compute resource by storing an image of the application; and migrate the image of the application to the second compute resource.

2. The SDI system of claim 1, the compute resources comprising physical processors, memory, and storage.

3. The SDI system of claim 1, wherein the composite node is to be created using the first compute resource based on a determination that compute resources of the preferred compute resource type in the SDI system are not available to execute the application, wherein the application is to be hibernated responsive to an interrupt.

4. The SDI system of claim 3, wherein the image of the application is stored at a first memory location within a designated disaggregated portion of two or more compute resources, the instructions, that when executed by the processor circuit, cause the processor circuit to:

write the first memory location to a second memory location reserved for migration operations.

5. The SDI system of claim 4, the second memory location to comprise a first model-specific register (MSR), the instructions, that when executed by the processor circuit, cause the processor circuit to set a flag in a second MSR to indicate that the application is to be resumed.

6. The SDI system of claim 5, wherein a software stack of the second compute resource resumes the application based on detecting the flag in the second MSR when the software stack is booted.

7. The SDI system of claim 1, the instructions, that when executed by the processor circuit, cause the processor circuit to receive an indication when the migration has finished.

8. The SDI system of claim 7, the instructions, that when executed by the processor circuit, cause the processor circuit to release the first compute resource upon receiving the indication when the migration has finished.

9. The SDI system of claim 1, the instructions, that when executed by the processor circuit, cause the processor circuit to:

determine that the second compute resource matches the preferred compute resource type based upon a migration table, wherein the migration table is to specify that the first compute resource is to be recomposed when a compute resource of the preferred compute resource type becomes available based on the first compute resource being of the alternative compute resource type.

10. A computer-implemented method, comprising:

receiving a request to create a composite node, the request specifying an application to be executed on the composite node, a preferred compute resource type for the composite node, and an alternative compute resource type for the composite node, wherein the alternative compute resource type is to be defined by a first set of compute resource requirements, wherein the preferred compute resource type is to be defined by a second set of compute resource requirements, wherein the second set of compute resource requirements is to comprise a greater amount of compute resources than the first set of compute resource requirements;

creating the composite node using a first compute resource of the alternative compute resource type, the first compute resource of the composite node to execute the application;

receiving an indication that a second compute resource of the preferred compute resource type has become available;

hibernating the application executing on the first compute resource by storing an image of the application; and migrating the image of the application from the first compute resource to the second compute resource.

11. The computer-implemented method of claim 10, the compute resources comprising physical processors, memory, and storage.

12. The computer-implemented method of claim 10, wherein the composite node is to be created using the first compute resource based on a determination that compute resources of the preferred compute resource type in a SDI system are not available to execute the application, wherein the application is to be hibernated responsive to an interrupt.

13. The computer-implemented method of claim 12, wherein the image of the application is to be stored at a first memory location within a designated disaggregated portion of two or more compute resources.

14. The computer-implemented method of claim 13, wherein the second compute resource determines the first memory location based upon writing the first memory location to second memory location reserved for migration operations, the second memory location to comprise a first model-specific register (MSR), the method further comprising setting a flag in a second MSR to indicate that the application is to be resumed.

15. The computer-implemented method of claim 14, wherein the second compute resource determines the first memory location based upon a message specifying the first memory location.

16. The computer-implemented method of claim 10, further comprising receiving an indication when the migration has finished.

17. The computer-implemented method of claim 16, further comprising releasing the first compute resource upon receiving the indication when the migration has finished.

18. The computer-implemented method of claim 10, further comprising determining that the second compute resource matches the preferred compute resource type based upon a migration table.

19. The computer-implemented method of claim 10, wherein performance of the migration is dependent upon the use of memory disaggregated from the first or second compute resource.

20. An article comprising a non-transitory computer-readable storage medium that stores instructions for execution by processing circuitry of a software-defined infrastructure (SDI) system, the instructions to cause the processing circuitry to:

receive a request to create a composite node from an orchestrator component, the request to specify an application to be executed on the composite node, a preferred compute resource type for the composite node, and an alternative compute resource type for the composite node, wherein the alternative compute resource type is to be defined by a first set of compute resource requirements, wherein the preferred compute resource type is to be defined by a second set of compute resource requirements, wherein the second set of compute resource requirements is to comprise a greater amount of compute resources than the first set of compute resource requirements;

create the composite node using a first compute resource of the alternative compute resource type, the first compute resource of the composite node to execute the application;

receive an indication that a second compute resource of the preferred compute resource type has become available;

hibernate the application executing on the first compute resource by storing an image of the application; and migrate the image of the application to the second compute resource.

21. The article of claim 20, the compute resources comprising physical processors, memory, and storage.

22. The article of claim 20, wherein the composite node is to be created using the first compute resource based on a determination that compute resources of the preferred compute resource type in the SDI system are not available to execute the application, wherein the application is to be hibernated responsive to an interrupt.

23. A software-defined infrastructure (SDI) system, comprising:

means comprising a processor for receiving a request to create a composite node, the request specifying an application to be executed on the composite node, a preferred compute resource type for the composite node, and an alternative compute resource type for the composite node, wherein the alternative compute resource type is to be defined by a first set of compute resource requirements, wherein the preferred compute resource type is to be defined by a second set of compute resource requirements, wherein the second set of compute resource requirements is to comprise a greater amount of compute resources than the first set of compute resource requirements;

means for creating, by the processor, the composite node using a first compute resource matching the alternative compute resource type, the first compute resource of the composite node to execute the application;

means for receiving, by the processor, an indication that a second compute resource of the preferred compute resource type has become available;

means for hibernating, by the processor, the application executing on the first compute resource by storing an image of the application; and means for migrating, by the processor, the application from the first compute resource to the second compute resource.

24. The SDI system of claim 23, the compute resources comprising physical processors, memory, and storage, wherein the hibernation of the application is responsive to an interrupt.

25. The article of claim 20, the instructions to cause the processing circuitry to:

recreate the composite node using the second compute resource responsive to receiving the indication that the second compute resource of the preferred compute resource type has become available.

\* \* \* \* \*